Dec. 28, 1926.

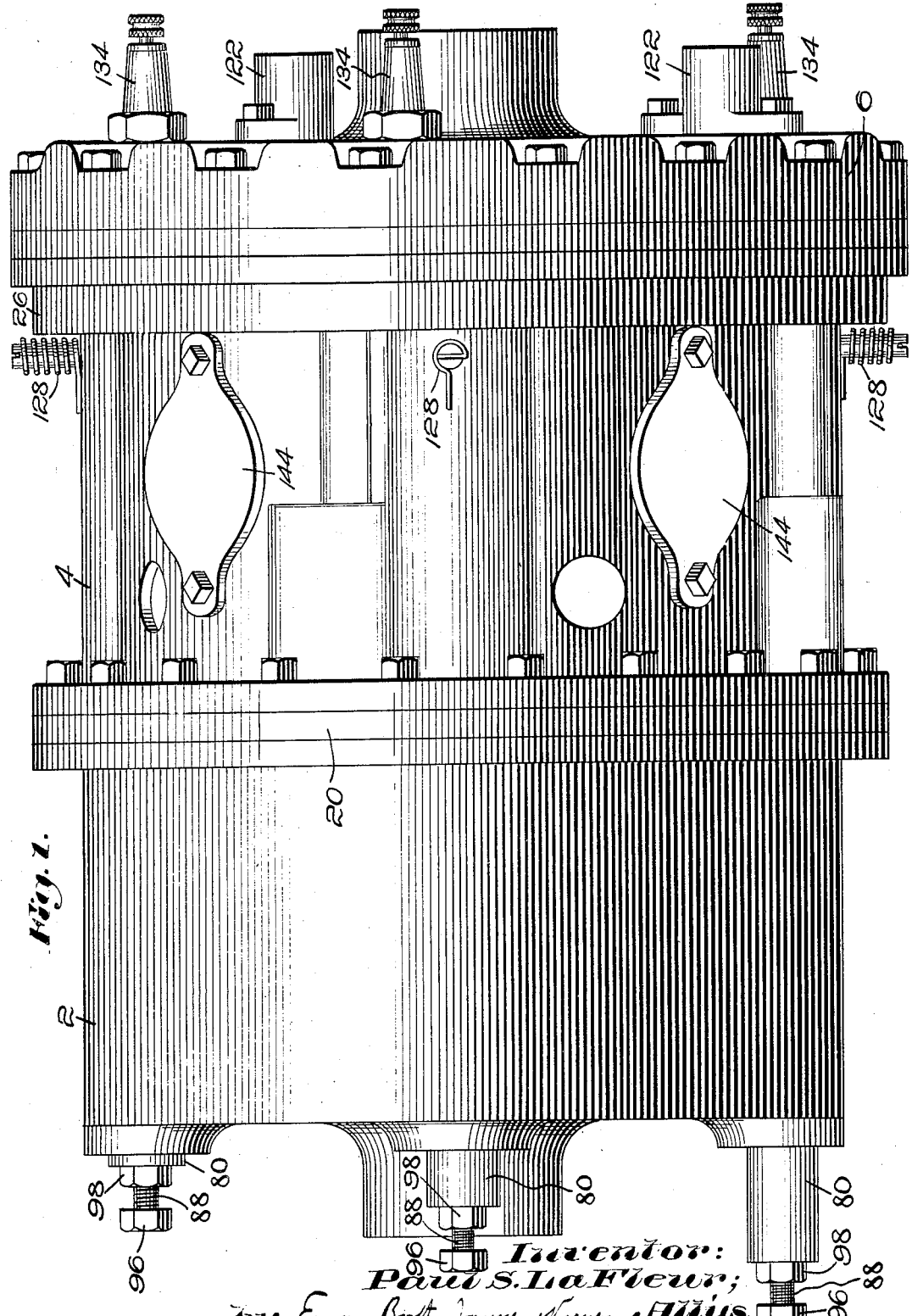

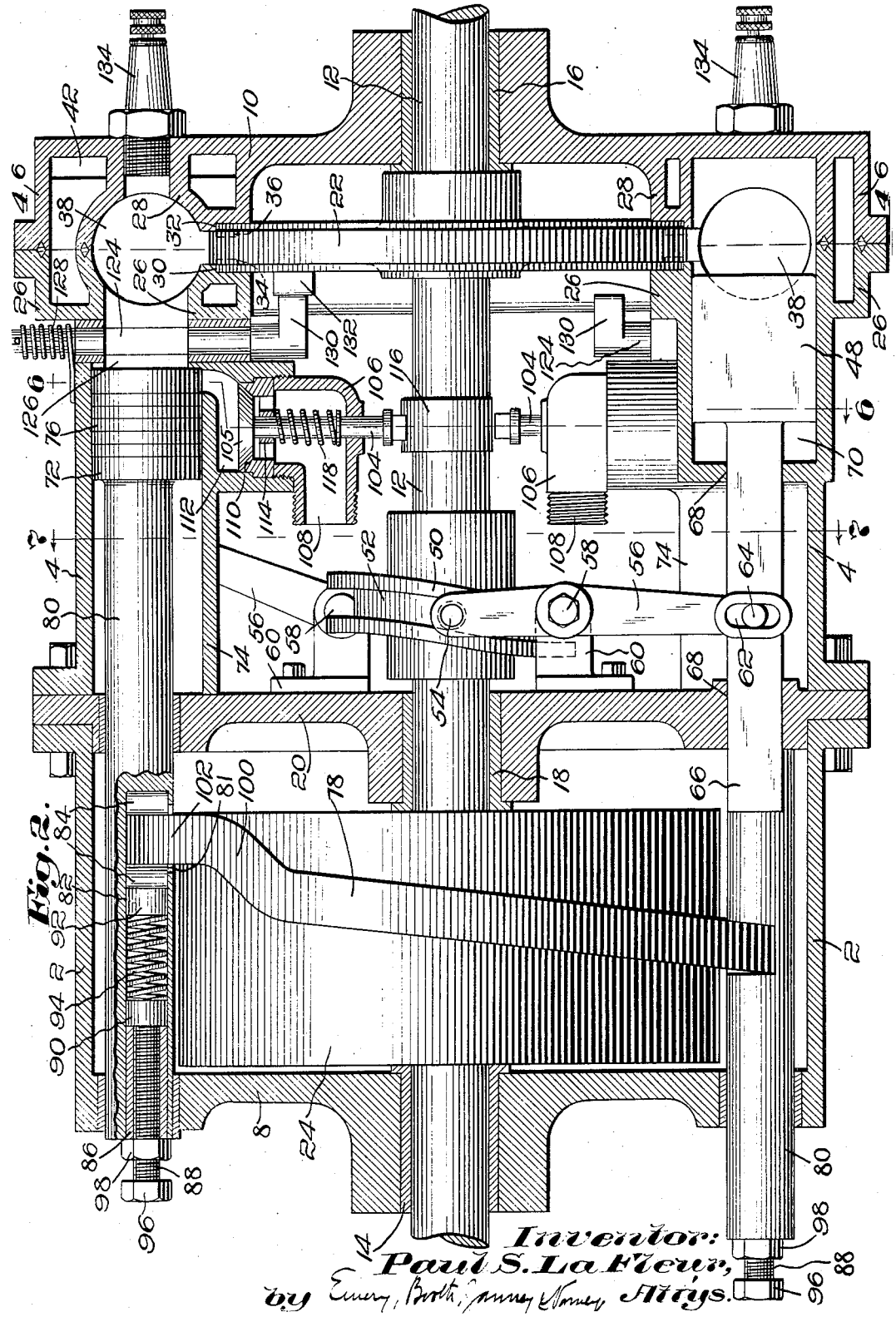

P. S. LA FLEUR 1,612,785

INTERNAL COMBUSTION ENGINE

Filed March 10, 1921  6 Sheets-Sheet

Inventor:
Paul S. La Fleur,
by Emery, Booth, Janney & Varney
Attys.

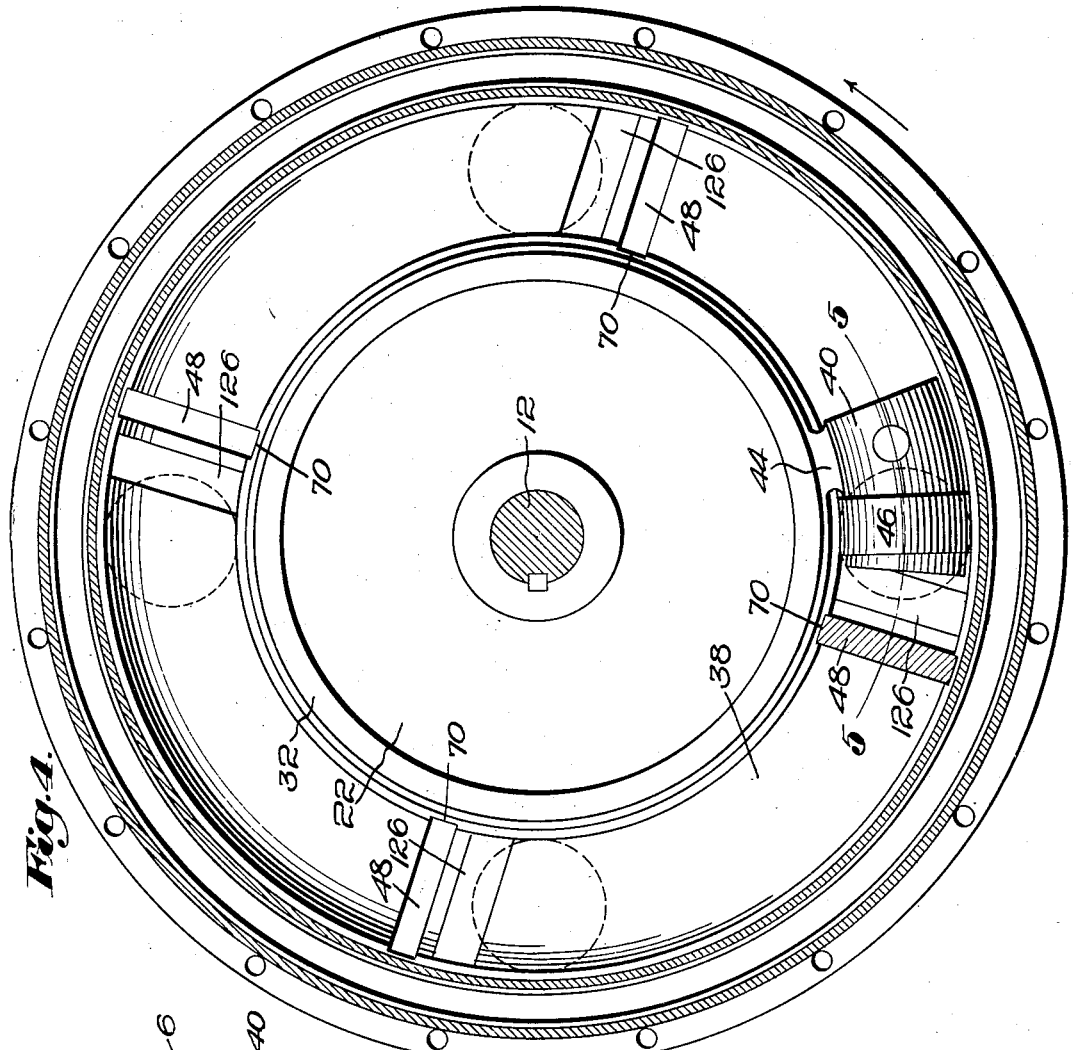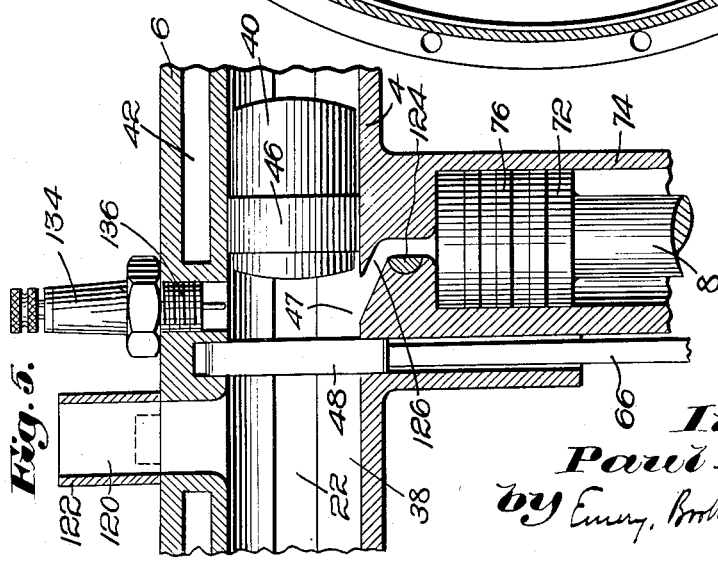

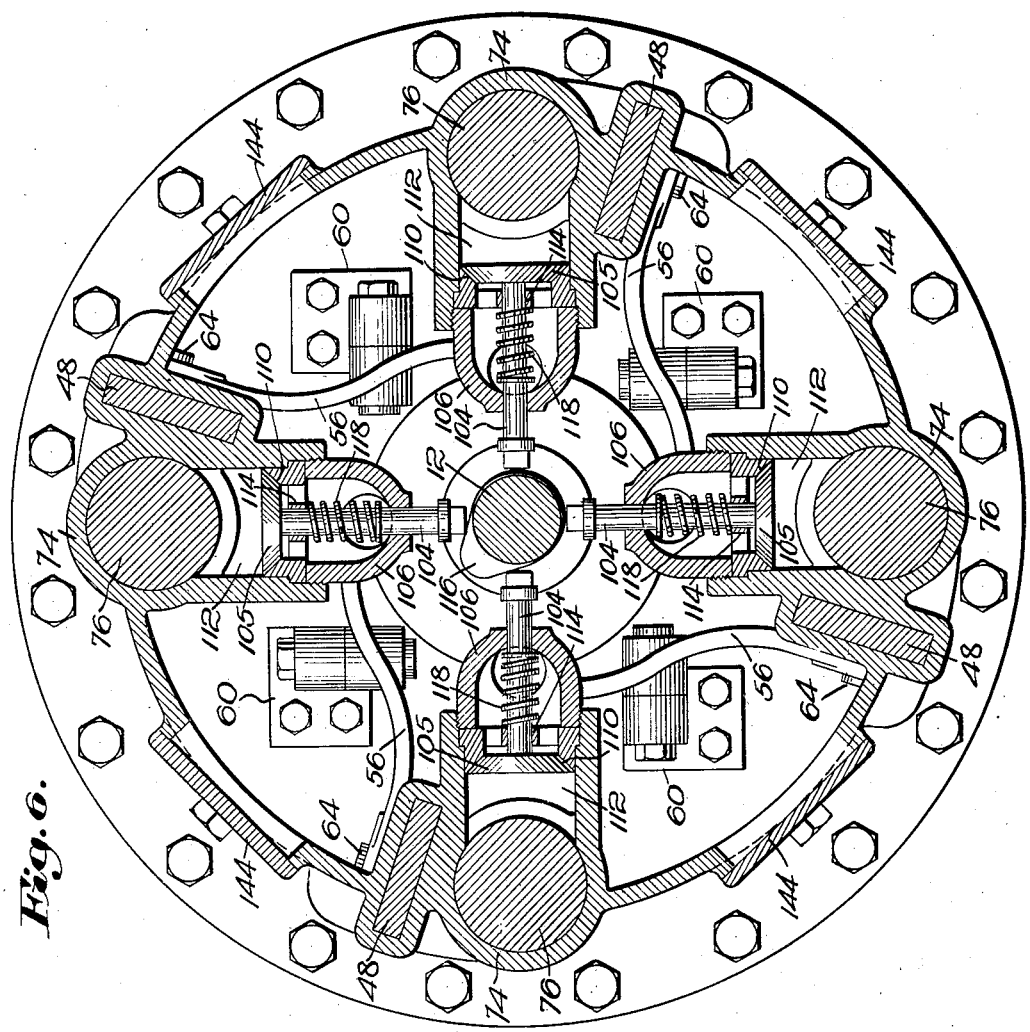

Dec. 28, 1926.

P. S. LA FLEUR 1,612,785

INTERNAL COMBUSTION ENGINE

Filed March 10, 1921    6 Sheets-Sheet 6

Inventor:
Paul S. La Fleur,
by Emery, Booth, Janney & Varney
Attys.

Patented Dec. 28, 1926.

1,612,785

UNITED STATES PATENT OFFICE.

PAUL S. LA FLEUR, OF HAVERHILL, MASSACHUSETTS, ASSIGNOR OF ONE-THIRD TO CHARLES E. LEONARD, OF HAVERHILL, MASSACHUSETTS, AND ONE-THIRD TO FRED LA FLEUR, OF SOUTH KINGSTON, NEW HAMPSHIRE.

INTERNAL-COMBUSTION ENGINE.

Application filed March 10, 1921. Serial No. 451,251.

This invention relates to internal combustion engines in general and more particularly to internal combustion engines of the rotary type.

The invention and its objects and aims will be best understood from the following description, taken in connection with the accompanying drawings, of one embodiment of the invention herein shown for illustrative purposes.

Referring to the drawings:

Fig. 1 is a side elevation of an internal combustion engine embodying one form of my invention shown for illustrative purposes;

Fig. 4 is a cross-section of the engine shown in Fig. 2, on line 4—4 of the latter figure, showing more particularly the driving piston race and gates cooperating therewith to form the explosion chambers;

Fig. 5 is a sectional detail on line 5—5 of Fig. 4 of a portion of the driving piston race, showing the driving piston and one of the gates and compression pistons cooperating therewith, the gate being closed to form an explosion chamber and the compression piston being at the end of its compression stroke;

Fig. 6 is a cross-sectional elevation on line 6—6 of Fig. 2, showing more particularly the intake valves and their operating mechanism;

Fig. 7 is a cross-sectional elevation on line 7—7 of Fig. 2, showing more particularly the gate operating mechanism.

Figure 2:
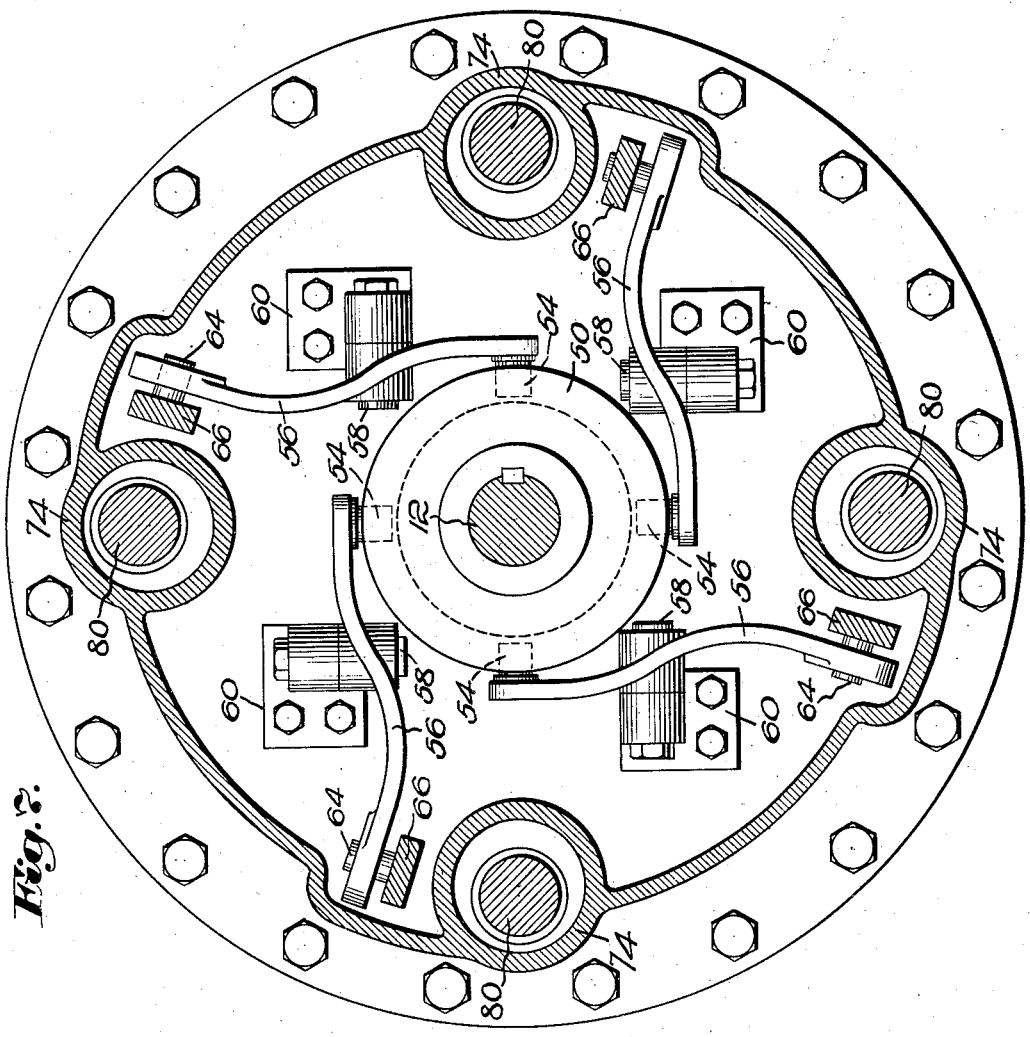
Fig. 2 is a longitudinal sectional elevation of the engine shown in Fig. 1.

The casing or carter of the engine may be of any suitable construction and arrangement. Referring to Figs. 1 and 2, in the illustrative embodiment of the invention herein shown, the casing is of generally cylindrical form and for convenience of assembling and accessibility of parts will preferably be made in three sections 2, 4 and 6 placed end to end and rigidly secured together by bolts extending through flanges of said sections or in any other suitable manner. The heads 8 and 10 of the casing will preferably be made integral with the casing sections 2 and 6 respectively.

A shaft 12 extends longitudinally and axially of the casing and is mounted in suitable bearings 14 and 16 provided in the heads 8 and 10 respectively, and in an intermediate bearing 18 provided in a web or partition 20, clamped in place at its edge between the flanges of the casing sections 2 and 4. The shaft being relatively short, this three-bearing mounting makes for extreme rigidity and precludes distortion or whipping of the shaft.

Rigidly secured in any suitable manner to the shaft 12, adjacent one end thereof, is a member to which is connected a driving piston 40, as hereinafter more fully explained. Said member may be of any suitable construction and form, and herein consists of a circular rotor 22, Figs. 2 and 4. Adjacent its opposite end said shaft has rigidly mounted thereon, in any suitable manner, a fly wheel 24. The rotor 22 is guided at its edge between opposed circular guide-portions 26 and 28, projecting inwardly from the casing sections 4 and 6 respectively, said circular portions 26 and 28 being preferably integral with said sections. In the opposite faces of the rotor 22, adjacent its periphery are provided grooves 30 and 32 concentric with said rotor. Said grooves receive rings 34 and 36 respectively to provide a gas tight fit of said rotor in said portions 26 and 28.

The circular race 38 in which travels the driving piston 40, Figs. 4 and 5, is herein formed one-half in the casing section 6 and the other half in the casing section 4 and is preferably provided with a water jacket 42 through which water may be caused to circulate in any suitable and usual manner not necessary herein to describe. The piston 40 is provided with a lateral portion 44, Fig. 4, by which it is secured to the periphery of the rotor 22. The piston 40 has a loose fit in the race 38 as shown in Figs. 4 and 5, and may be provided with one or more piston rings to prevent leakage around the piston. Herein a single relatively wide piston ring 46 is used, in preference to a plurality; as a single wide piston ring clears the gate openings more readily than would a plurality of narrow ones. It will be understood that the piston 40 is curved longitudinally to correspond to the curvature of the race.

Cooperating with the driving piston 40 is means for forming an explosion chamber, said means herein operating by temporarily closing off a portion of the race 38 behind the piston 40 so as to form a temporary chamber in which the explosive mixture may be ignited to impart driving movement to the driving piston. One such chamber is shown at 47 in Fig. 5. Herein said means comprises a gate 48, shown in Figs. 2, 4 and 5. The number of gates, and consequently of the explosion chambers, will vary according to the number of impulses which it is desired to impart to the driving piston during a single rotation of the shaft 12. Other things being equal, it will be readily understood by those skilled in the art that the greater the number of impulses imparted to the driving piston during each revolution thereof about the axis of the shaft 12, the greater will be the horse power developed by the engine. In the embodiment of the invention herein described for illustrative purposes the driving piston 40 receives four impulses during each revolution thereof about the shaft 12 and accordingly there are provided four gates 48 as shown in Fig. 4. Herein these four gates are preferably spaced 90° apart around the race 38. As the piston 40 travels around the race, these gates 48 are moved consecutively into position behind the piston to close off a portion of the interior of the race, thus forming successively four explosion chambers, such as the one represented at 47 in Fig. 5. After the explosion in an explosion chamber has taken place, the gate for that explosion chamber is withdrawn from the race to provide a free passage for the driving piston, in its continued travel around the race.

Figure 8:
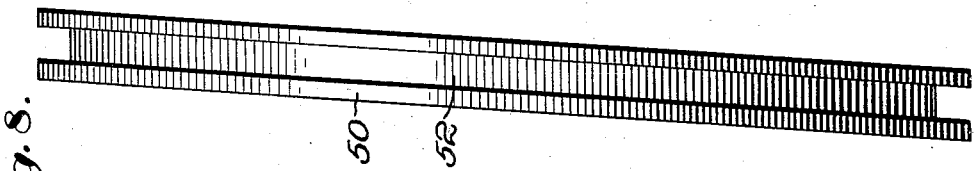
Fig. 8 is a development of the gate controlling cam groove.

Means is herein provided successively to move each gate into and out of operative position as above described. Herein, Figs. 2, 7 and 8, said means preferably comprises a cam disk 50, having a peripheral cam groove 52 engaged by four cam studs 54 provided upon one end of levers 56. These levers 56 are pivoted intermediate their ends upon studs 58 mounted in brackets 60 bolted to one side of the partition 20, and at their other ends are provided with slots 62 engaged by pins 64 on slide bars 66.

The bars 66 carry the gates 48. The bars 66 are each adapted to slide in guides 68, 68 provided in the partition 20 and the part 26 of the casing section 4 respectively, and the gates 48 have a sliding fit in chambers 70 formed in parts 26 and 28 of the casing sections 4 and 6, respectively (Fig. 2).

It will be apparent from the preceding description that as the shaft 12 rotates, the cam groove 52 will oscillate the levers 56 so as to reciprocate the gates 48, said gates travelling in planes extending perpendicularly to and radially of the circular race 38.

In accordance with my invention means are provided to compress the explosive mixture in the explosion chambers. In the illustrative embodiment of the invention herein shown said compression means comprises a piston, four such pistons 72 being herein provided, one for each explosion chamber. Each piston 72 is adapted to travel in a cylinder 74, see Figs. 2, 5 and 7, in which it has a relatively loose fit, one or more rings 76 being provided to render said pistons gastight. The cylinders 74 are preferably of greater capacity than their explosion chambers; they are preferably formed integral with the casing section 4 and are directed perpendicularly to the plane of the rotor 22. Suitable means are provided for operating the pistons, said means herein preferably and conveniently comprising a cam rib 78, Fig. 2, on the periphery of the fly wheel 24, extending around the latter and cooperating with the piston rods 80 of the pistons 72. This cam rib 78 is so shaped that as the fly wheel 24 rotates each piston will be moved into position at the proper time to compress the explosive mixture in the explosion chamber with which it cooperates. Referring to Fig. 2, the rear portion of the piston rod 80 is provided with a longitudinal bore 82 in which are provided two cam rolls 84 engaging the opposite faces of the cam rib 78 which extends into said bore through a lateral slot 81 provided in the wall of the piston rod bore 82. In the rear end of said bore is closely fitted an internally screw threaded sleeve 86 to receive an adjusting screw 88 with which it has screw threaded connection. At the inner end of the screw 88 there is provided a disk 90 in the bore 82, and adjacent the inner roller 84 there is provided a similar disk 92 in said bore, both of said disks being slidable within the bore and being separated by a helical spring 94. At the outer end the screw 88 is provided with a nut 96 for turning the same and a lock nut 98 is also preferably provided on said screw for locking it in adjusted position. The slot 81 being somewhat longer than the width of the cam rib 78 it will be seen that the retractile movement of the piston 80 will be effected yieldingly through the spring 94. The tension of the spring 94 may be adjusted by the adjusting screw 96 as desired.

It will thus be seen that while the forward or compressing stroke of the piston 72 will be effected positively, its rearward movement may be effected yieldingly the occasion arising. This yielding connection compensates for wear of the parts such as the rollers 84, and eliminates any jar in the operation of the piston.

The cylinders and pistons described constitute convenient means for furnishing the charges of explosive mixture to the explosion chambers. Each cylinder constitutes a chamber, which, as hereinafter described, communicates with a supply of explosive mixture, and the piston constitutes a convenient means for filling said chamber with explosive mixture and forcing it into the explosion chamber.

The final compression stroke of the piston is effected by the inclined portion 100 of the cam rib 78, Fig. 2, and it will be noted that this inclined portion is followed immediately by a straight portion 102 which operates to lock the piston in position at the end of its compression stroke during the explosion of the explosive mixture in the explosion chamber. From an examination of the cam rib 78, Fig. 2, it will be seen that a considerable portion of the compression stroke of the piston 72 is herein effected gradually, only the latter portion of the compression stroke being effected quickly by the inclined portion 100 of the cam rib. Rearward movement of the piston is effected gradually throughout the entire length of said movement. It is by this rearward movement of the piston 72 that the explosive mixture is drawn into the cylinder 74, and a more even and satisfactory filling of the cylinder and explosion chamber with the explosive mixture is secured by the slow rearward movement of the piston than if the movement were more rapid, as the slower movement produces a more even suction.

The intake valves may be of any suitable construction. Herein they are shown as of the ordinary puppet valve type, Fig. 2. The valve stem 104 of each valve 105 is mounted for sliding movement in the wall of a valve chamber 106, provided with an intake opening 108, Fig. 2, and an outlet 110 providing a valve seat for the valve member 105 and opening into a chamber 112 communicating with the interior of the cylinder 74 and with the explosion chamber 47, Fig. 5. Besides being guided in the wall of the valve chamber the valve stem is also preferably guided in a web 114 extending across the valve chamber near its outlet 110.

The valves may be operated by any suitable means. Herein they are opened by a cam 116 upon the shaft 12, Figs. 2 and 6, and are closed by springs 118. In the rotation of the cam 116 the valves are opened in succession, each one to supply explosive mixture to its cylinder 74 as the compression piston 72 of its cylinder moves rearwardly; while during the forward movement of the pistons the valves are maintained closed by their springs.

The intake openings 108 of the four valve chambers 106 are screw threaded to facilitate their connection to any suitable manifold or similar device for supplying them with the necessary explosive mixture.

Figure 3:
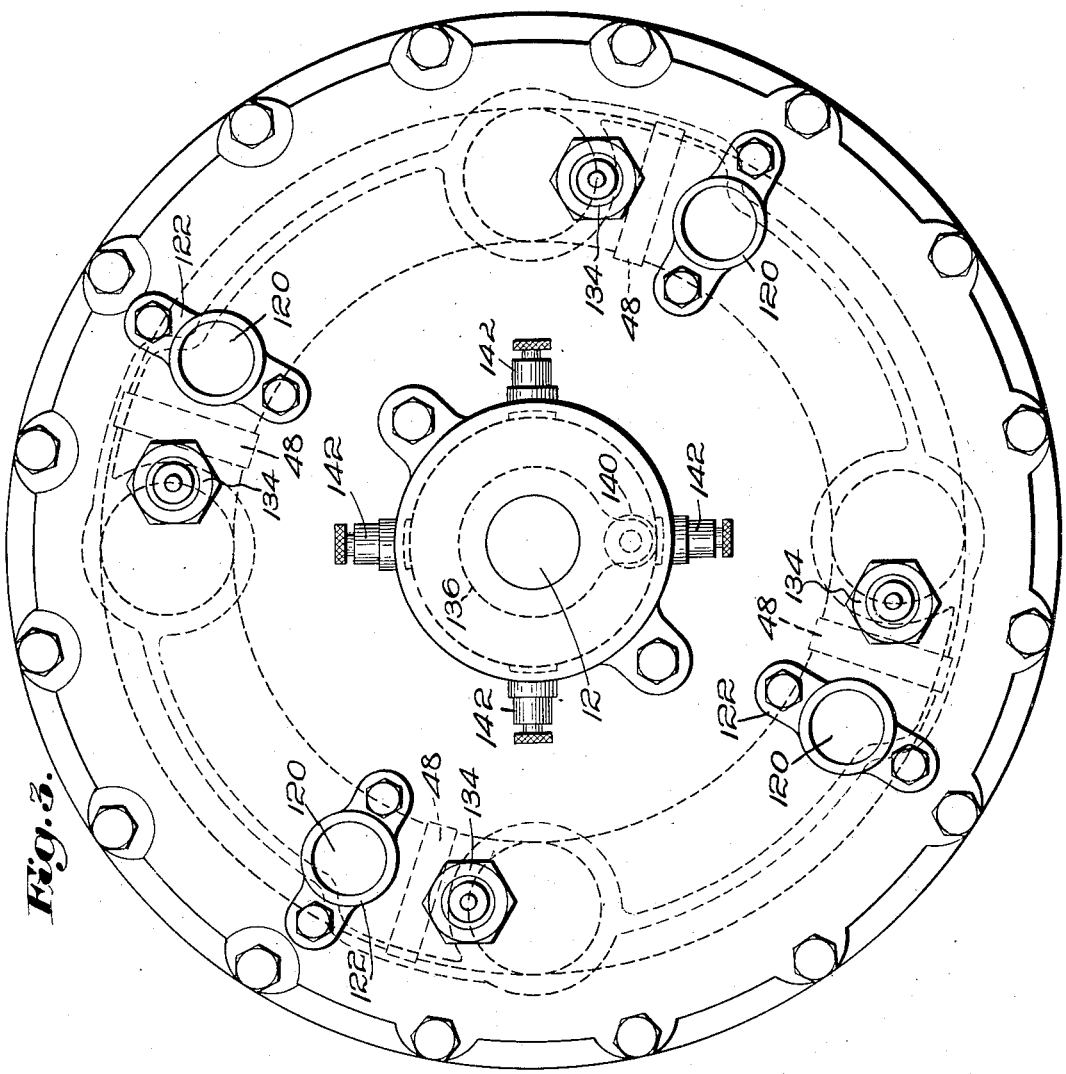
Fig. 3 is an end elevation of the engine shown in Fig. 1, viewed from the left of the latter figure.

Herein, Fig. 3, four exhaust ports 120 are provided for exhausting the burnt gases from the race 38 and explosion chambers. Herein said exhaust ports are provided in the head 10 of the casing and open directly from the race 38. The position of each exhaust port is so chosen relatively to its corresponding combustion chamber, that the driving piston 40 shall have received the full benefit of the explosion before or substantially at the time that said piston reaches and uncovers the exhaust port. Each exhaust port may be provided with an exhaust nozzle 122 bolted to the casing head 10. These nozzles may all be connected in any suitable manner with a muffler or may be allowed to exhaust directly into the atmosphere.

Means is preferably provided to prevent the compression pistons from drawing air or burnt gases from the race into the compression cylinders in the rearward or intake stroke of said pistons. In the embodiment of the invention herein described for illustrative purposes, said means may conveniently consist of a rotary valve member 124, Figs. 2 and 5, one such valve member being provided in the passage 126 leading from each compression chamber 74 to the race 38. Said valve members are herein shown as cylindrical and mounted for rotary movement in the part 26 of the casing section 4. As more clearly shown in Fig. 5, said valve members are received partially in correspondingly shaped recesses provided in one wall of the passage 126 and are cut away by one-half throughout that portion of their length that is co-extensive with the greatest diameter of the passage 126. As shown in Fig. 5, when such a valve member is turned into the position shown in that figure, its cut away portion coincides with said passage, thus allowing free communication between the cylinder 74 and the race 38. If, however, said valve member be turned 90° from the position in Fig. 5 about its longitudinal axis, it will close said passage 126.

A coiled spring 128, Figs. 1 and 2, encircling the upper end of each valve member 124 and having one end secured in a slot in the upper end of said valve member and its other end secured in any suitable manner to the casing section 4, tends normally to maintain the valve member in the position shown in Fig. 5, in which position there is free communication between the compression cylinder and the race. Upon the inner end of each valve member there is provided an arm 130 extending at right angles thereto. Upon the inner face of the rotor there is provided a dog 132, and in the rotation of said rotor, said dog successively meets the arms 130 of the four valve members and turns each one into closed position at the proper time, the length of the cam surface of the dog being such as to maintain each valve member closed during the required length of time. When its arm 130 is released by the dog 132 each valve member will be returned to open position by its spring 128.

A spark plug 134 is provided for each explosion chamber. Herein the four spark plugs are shown as screwed into openings 136, Fig. 5, provided in the wall of the casing head 10 in suitable position relative to their explosion chambers.

The spark plugs 134 will be connected up in any suitable manner to any suitable ignition system not shown. Suitable means will be provided to cause the spark to be produced at the proper time at each spark plug. Said means may comprise a timer or commutator of any suitable type, said timer herein comprising a disk 138 mounted on the shaft 12, see Fig. 3, and having a contact 140 in the ignition circuit and which upon rotation of said shaft contacts with four contacts 142 in succession, one of which is connected up to each one of the spark plugs in said circuit. In this or any other suitable manner the ignition of each of the four charges in succession and at the proper time will be secured.

Any suitable lubricating system, not shown, may be used.

I will now give a brief description of the operation of the illustrative embodiment of the invention described.

Assuming that the engine has been started by manual cranking or in any other manner, then as the rotor 22 rotates, the driving piston 40 moves around the race 38 in a contraclockwise direction, Fig. 4, or clockwise direction in Fig. 5. As the piston 40 passes each gate 48, the gate will be moved relatively quickly into closed positio, Fig. 5, by the cam groove 52 and lever 56. The cam 52 is so timed that the gate is moved into closed position behind the piston 40 practically as soon as the piston has passed the gate; and while the piston 40 is still only a short distance from the gate, the compression piston 72 cooperating with that gate will be moved by its cam 78 substantially into the position shown in Fig. 5 to drive the explosive mixture contained in the compression cylinder 74 through the passage 126 into the explosion chamber 47 and compress it therein.

The explosive mixture contained in the explosion chamber 47 is ignited by the spark plug substantially at this time, the rotor thus receiving an impulse in the direction in which it is travelling. About this time the gate 48 is withdrawn from the race by the operation of the cam groove 52 and lever 56, the valve 124 is closed by the action of the dog 132 on the arm 130 of said valve and the compression piston 72 is retracted by its cam 78 to draw in a fresh charge of explosive mixture through the valve 105, which has in the meantime been opened by its cam 116. During the compression stroke of the compression piston, the valve 105 is held closed by its spring 118, the end of the valve stem 104 then running on the concentric portion of said cam. The cycle of operations now repeats itself, the valve 124 being opened at the appropriate time to give passage for the explosive mixture contained in the compression cylinder as said mixture is compressed into the explosion chamber, as above described, on the compression stroke of the compression piston.

The above cycle of operation is executed by the gate 48, piston 72, valves 124 and 105 and spark plug 134 of each power unit.

As already stated, the exhaust of the burnt gases is effected by the piston 40 through the exhaust port 120, said piston driving the burnt gases before it and out of said port in its travel around the race. By the closure of the valve 124 at the proper time the drawing in of burnt gases or air from the race is prevented.

The invention possesses many advantages over similar machines heretofore constructed. All cranks, connecting rods, timing gears and cam shaft transmission gears are eliminated. The intake valves are operated by a single cam on the engine shaft. There is a complete scavenging of the burnt gases, the explosion chambers being completely free of burnt gases before a fresh explosive mixture is introduced, thus insuring a charge of pure explosive mixture in each combustion chamber, even when the engine is operating at high speed. All transverse stress on the shaft is practically eliminated, practically all the energy generated by the explosion being expended or used in useful work to rotate the shaft. The engine is extremely light in comparison to the power developed. The valves are all readily accessible for grinding. The head 10 may be readily removed, thus giving free access to the race for the removal of carbon, etc. The valves are readily accessible through openings, closed by removable doors 144. Removal of the valves for grinding or any other purpose is therefore a simple matter. The casing, pistons and rotor may all be made of aluminum or of a suitable aluminum alloy, thus providing for great lightness. The compression cylinders may all be cast in a single piece as shown in the embodiment illustrated, cast iron being used, but said compression cylinders could be made separate, in which case they could also be made of aluminum or of a suitable aluminum alloy, thus adding to the lightness of the whole construction. The driving piston 40 being rigidly connected to the rotor is rigid with the driving shaft and can thus be made of a diameter less in cross-section than that of the race without danger of rattling, a tight fit being secured by a piston ring or rings. Owing to the absence of transverse or lateral stress on the driving shaft, there is no tendency of the bearings to wear unevenly from that cause. By increasing the diameter of the rotor or by increasing the number of explosion chambers and cooperating parts or by increasing both of these, the power of the engine can be increased practically at will. An increase in the diameter of the race would also make for an increase of power, but the other two methods are preferable. Assuming, as an illustration, that the inside diameter of the race is 2 inches and the driving piston is 6 inches from the driving shaft, this would represent a driving cylinder of 2-inch bore and a crank shaft having a crank of 6 inches. Such a combination would be impracticable in the ordinary internal combustion engine of the reciprocatory piston type, but is perfectly feasible in the engine illustrated, thus securing increased power while preserving the small bore cylinder, with all the resulting benefits such as absence of vibration, greater lightness, less noise, low gas consumption, etc. It will be noted that in the preferred construction shown the explosion chamber is formed in the race and the gases are ignited in the explosion chamber. The ignition and expansion of the explosive charge thus begins and ends in the race behind the piston whereby a much more gradual, even, and therefore effective application of the explosive force is obtained than would be the case if the ignition were effected in a chamber or space outside of the race and progress thence into the race. In the illustrative example above given the compression cylinder having a bore of 2 inches and assuming the explosive mixture to be compressed by a four-inch stroke of the compression piston into the space behind the driving piston when the rear face of the driving piston is only about one inch from the gate and is ignited while the driving piston is substantially in that position, then it will be seen that the compression is relatively great. The engine embodying my invention is relatively light, and small in proportion to the power it develops; it is simple in construction, comprises few parts and as compared with other internal combustion engines the amount of work produced is greater in proportion to the force and energy required.

It will be noted that all of the working parts, including the valves, are completely enclosed in the casing, which makes for silence and prevents the penetration of dust, grit, and other foreign matter to the valves and other mechanism.

It will be apparent to those skilled in the art that engines constructed in accordance with the present invention possess other advantages besides those specifically referred to. It will also be apparent that it is not indispensable that all of the features of the invention be used conjointly since they may be used to advantage separately in various combinations and sub-combinations. It will be understood also that while the invention is herein described as embodied in the details illustrated, the invention is not to be considered as circumscribed by or limited to these details, or any of them, but the said details may be variously modified within the true scope of the invention which is definitely set forth by the claims.

Claims:

1. In a rotary internal combustion engine, in combination, a race; a shaft; a driving piston connected to said shaft and adapted to travel in said race; a plurality of chambers each adapted to communicate with said race; means to supply explosive mixture to said chambers; a plurality of controlling means independent of said chambers for controlling communication between said chambers and said race; and unitary means actuated by said shaft to positively operate said plurality of controlling means to cut off communication between said chambers and said race.

2. In a rotary internal combustion engine, in combination, a rotary shaft; a rotor fixed on said shaft; a circular race concentric with said shaft; a driving piston to travel in said race and connected to said rotor; a cylinder extending transversely to the plane of said race; a piston to work in said cylinder; cam means driven by said shaft to reciprocate said piston in said cylinder; a gate movable transversely to the plane of said race, to and from position to close off said race and form an explosion chamber therein behind said driving piston; cam means on said shaft; operating mechanism between said cam means and said gate to actuate the latter from the former; valve controlled passages leading from a source of supply of explosive mixture to said cylinder and from said cylinder to said explosion chamber; means to ignite the explosive mixture in said explosion chamber; and an exhaust port for said race.

3. In a rotary internal combustion engine, in combination, a casing having two heads; bearings in said heads; a rotary shaft journalled in said bearings; a rotor fixed on said shaft; a circular race concentric with said shaft; a driving piston to travel in said race and connected to said rotor; a cylinder extending transversely to the plane of said race; a piston to work in said cylinder; a fly wheel fixed on said shaft; cam means on said fly wheel to reciprocate said piston in said cylinder; a gate movable transversely to the plane of said race, to and from position to close off said race and form an explosion chamber therein behind said driving piston; cam means on said shaft; operating mechanism between said cam means and said gate to actuate the latter from the former; an intake passage opening into said cylinder and connected to a source of supply of explosive mixture; an intake valve in said intake passage; cam means on said shaft to open said valve; means to close said valve; a passage leading from said cylinder to said explosion chamber; a valve in said last named passage; means operated by said rotor to close said last named valve; means to open said last named valve; means to ignite the explosive mixture in said explosion chamber; and an exhaust port for said race.

4. In a rotary internal combustion engine, in combination, a rotary shaft; a rotor fixed on said shaft; a circular race concentric with said shaft; a driving piston to travel in said race and connected to said rotor; a cylinder extending transversely to the plane of said rotor; a piston to work in said cylinder; driving mechanism between said piston and said shaft to drive the former from the latter chamber forming means to cooperate with said driving piston to form an explosion chamber in said race behind said piston; mechanism between said shaft and said explosion chamber forming means to operate the latter from the former; a valve controlled intake passage opening into said cylinder and connected to a source of supply of explosive mixture; a valve controlled passage leading from said cylinder to said explosion chamber; means to ignite the explosive mixture in said explosion chamber; and an exhaust port for said race.

5. In a rotary internal combustion engine, in combination, a rotary shaft; a circular race concentric with said shaft; a driving piston to travel in said race and connected to said shaft; a cylinder extending transversely to the plane of said race; a piston to work in said cylinder; chamber forming means to cooperate with said driving piston to form an explosion chamber behind said piston; mechanism between said shaft and said explosion chamber forming means to actuate the latter; valve controlled passages leading from a source of supply of explosive mixture to said cylinder and from said cylinder to said explosion chamber; a cam carried by said shaft; mechanism between said cam and said piston to cause said cam to move said piston yieldingly in one direction and positively in the opposite direction; means to ignite the explosive mixture in said explosion chamber; and an exhaust port for said race.

6. In a rotary internal combustion engine, in combination, a rotary shaft; a circular race concentric with said shaft; a driving piston to travel in said race and connected to said shaft; a compression cylinder; a piston to work in said cylinder; chamber forming means to cooperate with said driving piston to form an explosion chamber behind said driving piston; mechanism between said shaft and said explosion chamber forming means to actuate the latter; valve controlled passages leading from a source of supply of explosive mixture to said cylinder and from said cylinder to said explosion chamber; a cam driven by said shaft to reciprocate said piston, said cam being shaped to accelerate the movement of said piston toward the end of its compression stroke; means to ignite the explosive mixture in said explosion chamber; and an exhaust port for said race.

In testimony whereof, I have signed my name to this specification.

PAUL S. LA FLEUR.